United States Patent [19]

Usuki

[11] Patent Number: 5,896,847
[45] Date of Patent: Apr. 27, 1999

[54] LIQUEFIED FUEL VAPORIZING APPARATUS AND GAS ENGINE PROVIDED WITH THE SAME

[75] Inventor: Tadahiro Usuki, Nagoya, Japan

[73] Assignee: Mitsubishi Heavy Industries, Inc., Tokyo, Japan

[21] Appl. No.: 08/953,177

[22] Filed: Oct. 17, 1997

[30] Foreign Application Priority Data

Oct. 18, 1996 [JP] Japan ................................... 8-297227

[51] Int. Cl.⁶ ...................................................... F02M 31/00
[52] U.S. Cl. ........................................................... 123/557
[58] Field of Search ........................................ 123/527, 557

[56] References Cited

U.S. PATENT DOCUMENTS 2,115,684  4/1938  Porter ........................... 123/557
4,445,486  5/1984  Rao ............................... 123/557

FOREIGN PATENT DOCUMENTS

| 4-103864 | 4/1992 | Japan. |
| 5-141314 | 6/1993 | Japan. |
| 5-204114 | 9/1993 | Japan. |
| 6-66207  | 3/1994 | Japan. |

Primary Examiner—Noah P. Kamen
Attorney, Agent, or Firm—Alston & Bird LLP

[57] ABSTRACT

On a gas engine in which the liquid gas is vaporized and introduced to a mixer 74, a thick plate shaped vaporizer, which is made of a material with high thermal conductivity and formed with a fuel passage 80e therein, is fixed to a cylinder body in such a manner that heat is conducted to the fuel from the cylinder body. The inlet of the fuel passage 80e is connected to a liquefied gas vessel, and the outlet thereof is connected to the mixer 74. Thereby, the liquid fuel is heated in the fuel passage 80e in the vaporizer, or heated by a heat transfer plate provided in an exhaust passage.

10 Claims, 4 Drawing Sheets

F I G. 3
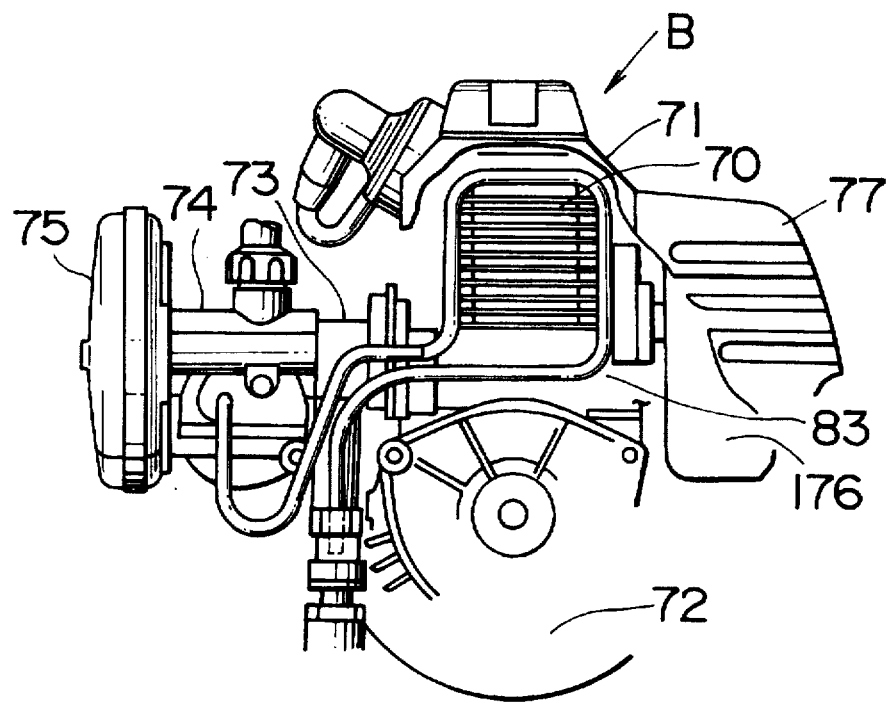
F I G. 4
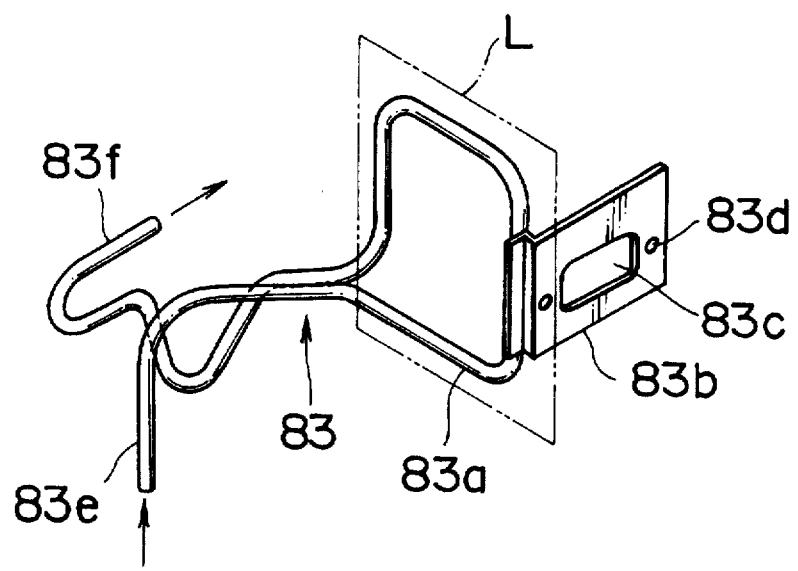

LIQUEFIED FUEL VAPORIZING APPARATUS AND GAS ENGINE PROVIDED WITH THE SAME

BACKGROUND OF THE INVENTION

The present invention relates to a liquefied fuel vaporizing apparatus for vaporizing a liquefied fuel contained in a liquefied gas vessel and supplying the vaporized fuel to a gas engine.

FIG. 8 is a schematic view showing an example of a liquefied fuel supplying apparatus for a conventional gasoline engine. A 2-cycle engine B mounted on a portable work machine includes a crankcase 23 connected to the lower part of a cylinder body 20 having many cooling fins, a recoil starter 24 for starting the engine connected to the front end of a crankshaft (not shown) via a clutch, and a blower connected to the rear end of the crankshaft.

The blower, which is contained in a fan case 22 connected to the back of the cylinder body and crankcase 23, sucks outside air from the rear end of the crankshaft. The cooling air from the blower is sent from the back of the cylinder body to the front part of the engine through the spaces between the cooling fins. A suction port provided on the left-hand wall of the cylinder body 20 is connected to a mixer C via an insulating tube 17, and an exhaust port provided on the right-hand wall is connected to an exhaust muffler 21. Reference numeral 19 denotes a spark plug.

A liquefied gas vessel or cylinder 3, which is similar to a cylinder used for a household portable cooking stove or the like, is mounted under the engine B by a holder 2. The holder 2 has a fuel cock 5 and a fuel outlet 6 on the right-hand wall thereof.

The liquefied gas vessel 3 is mounted elastically between the left-hand and right-hand walls of the holder 2 so that a fuel suction pipe 3a is below the liquid level. When the fuel cock 5 is opened, the liquid fuel in the vessel 3 is supplied to the mixer C of the engine B through the fuel suction pipe 3a, fuel cock 5, and fuel outlet 6. When the temperature of outside air is low (lower than about 10), most of the fuel at the fuel outlet 6 is in a liquid state.

A vaporizer 7 for vaporizing the liquid fuel sent from the liquefied gas vessel 3 is disposed on the front wall (the opposite side to the blower attaching portion) of the cylinder body 20 of the engine B. The vaporizer 7, consisting of a metallic tube bent into a U-shape, is disposed in a substantially horizontal position in front of the cylinder body 20.

An inlet 7a at one end of the vaporizer 7 is bent downward and is connected by a pipe 6a to the fuel outlet 6 of the liquefied gas vessel 3. An outlet 7b at the other end of the vaporizer 7 is connected to an inlet 12 of a primary pressure governor A. The primary pressure governor A includes a diaphragm 10 held between a housing 13 and a bottom plate 13a so as to define a fuel chamber 11 on the upper side of the diaphragm 10 and an air chamber on the lower side thereof. The primary pressure governor A also includes a valve element 8 supported on the wall of the fuel chamber 11 by a shaft 14 which is connected to the diaphragm 10 by a rod. The valve element 8 is urged by the force of a spring 9 so as to open the inlet 12.

The fuel chamber 11 supplies fuel to a constant-pressure fuel chamber 38 of a secondary pressure governor E through an outlet 12a, a pipe 15, and an inlet passage 44a of the secondary pressure governor E. The secondary pressure governor E is integral with the mixer C and includes a valve element 44. The mixer C includes a suction air passage 36 passing through the body 35 and connected at one end to an air cleaner (not shown) and at the other end to the insulating tube 17. The body 35 incorporates a publicly known piston type throttle valve 37, which protrudes into the suction air passage 36 through the upper wall, for heating the fuel and air supplied to the engine. The throttle valve 37 has a needle valve that protrudes into a fuel passage 37a, described later. When the throttle valve 37 is slid vertically by an accelerator lever (not shown), the air in the suction air passage 36 is accelerated so that the fuel is sucked from the constant-pressure fuel chamber 38 to the suction air passage 36 through the fuel passage 37a.

The secondary pressure governor E includes a diaphragm 40 held between the lower wall of the body 35 and a bottom plate 39 so as to define the constant-pressure fuel chamber 38 on the upper side of the diaphragm 40 and an air chamber on the lower side thereof. The constant-pressure fuel chamber 38 is provided with a lever 41 supported by a shaft 42. The left end of the lever 41 is engaged with the diaphragm 40, and the right end of the lever 41 is engaged with the valve element 44. The valve element 44 is urged by a spring 43 to close the fuel inlet passage 44a. When the fuel in the constant-pressure fuel chamber 38 is reduced in quantity and the fuel pressure is decreased, the lever 41 is turned clockwise by the diaphragm 40 acted upon by atmospheric pressure, so that the valve element 44 opens the inlet passage 44a to replenish fuel to the constant-pressure fuel chamber 38. The constant-pressure fuel chamber 38 opens the fuel passage 37a to the suction air passage 36.

An oil passage 34 opens into the suction air passage 36 to lubricate the engine. The oil passage 34 communicates with a transparent tube 33 connected to the upper wall of the body 35. The transparent tube 33 supports a valve casing 32 for an oil regulating valve D. A needle valve 31 threadedly supported by the valve chest 32a of the valve casing 32 regulates the quantity of oil flowing from the lower end outlet of the valve chest 32a to the transparent tube 33. Further, the oil from an oil tank 61 is supplied under pressure to the oil chest 32a through an outlet pipe 63 and pipe 45. For this purpose, pressurized air is supplied from an air pump F to the oil tank 61 through an inlet 62.

Next, the operation of the fuel apparatus for an engine configured as described above will be explained. When the engine B is running, the cooling air sent from the blower in the fan case 22 to the cylinder body 20 strikes a cover 18, and cools the cylinder body 20 when flowing in the substantially horizontal direction from the back to the front of the engine. When the cooling air is heated and discharged from the cover 18 at the front of the engine, the air heats the vaporizer 7. The liquid fuel from the liquefied gas vessel 3 is heated and vaporized by the vaporizer 7, entering the fuel chamber 11 of the primary pressure governor A through the inlet 12. When the pressure of fuel in the fuel chamber 11 becomes higher than a predetermined value, the valve element 8 closes the inlet 12 to keep the pressure of fuel in the fuel chamber 11 almost constant.

The fuel in the fuel chamber 11 enters the constant pressure fuel chamber 38 of the secondary pressure governor E through the valve element 44. When the pressure of fuel in the constant-pressure fuel chamber 38 increases, the diaphragm 40 is pushed down. The lever 41 subjected to the force of the spring 43 is turned by the diaphragm 40 to close the valve element 44, so that the pressure of fuel in the constant-pressure fuel chamber 38 is kept almost constant. The fuel in the constant-pressure fuel chamber 38 passes through the passage 37, and is mixed with the air in the suction air passage 36, and further sucked into the combustion chamber of the engine while being mixed with the oil from the oil passage 34.

The conventional gas engine shown in FIG. 8 is constructed so that the vaporizer 7 for vaporizing the liquid fuel is disposed close to the cylinder body 20 of the engine, and is subjected to the high-temperature cooling air after the cooling of the cylinder body, so that liquid fuel passing through the vaporizer is heated. The liquid fuel is vaporized completely when the outside air temperature is high as in the summer. However, in the winter or in other cases when the outside air temperature is lower than about 16, there is often insufficient heating of the fuel, so that often the liquid fuel is not vaporized completely.

When this happens, liquid fuel flows into the mixer, and therefore the mixer malfunctions, causing the engine to stop.

SUMMARY OF THE INVENTION

The present invention was made to solve the problems of the prior art, and therefore an object of the invention is to provide a liquefied fuel vaporizing apparatus having a high vaporization capacity, which can completely vaporize a liquid fuel.

According to a first embodiment of the present invention, a liquefied fuel vaporizing apparatus comprises a thick plate shaped vaporizer constructed of a material having high thermal conductivity such as an aluminum alloy and formed with a fuel passage therein. The vaporizer is fixed to a cylinder body of the engine in heat-exchanging relation therewith. The inlet of the fuel passage is connected to the liquefied gas vessel, and the outlet of the fuel passage is connected to the mixer. Thus, the liquid fuel is heated in the fuel passage of the vaporizer by thermal conduction from the cylinder body.

Therefore, the liquid fuel is heated by the heat applied by direct heat conduction from the cylinder body, so that the liquid fuel is heated to a temperature at which the liquid fuel is vaporized completely, and thus liquid fuel is prevented from flowing into the mixer.

Additionally, the plate-shaped vaporizing apparatus is of simple construction and thus can be made relatively inexpensively.

According to a second embodiment of the present invention, a liquefied fuel vaporizing apparatus comprises a fuel pipe which connects a mixer to the liquefied gas vessel and which has a lengthwise portion of the fuel pipe exposed in a passage of cooling air after the cooling of an engine cylinder. The fuel vaporizing apparatus also includes a heat transfer plate held between flange faces of an exhaust passage of the engine in such a manner that heat can be conducted to the heat transfer plate from the flange face. One end of the heat transfer plate is connected to the exposed portion of the fuel pipe. Thus, the liquid fuel in the exposed portion of the fuel pipe is heated and vaporized both by the high-temperature cooling air flowing over the exposed portion of the fuel pipe and also by the exhaust gas heat conducted through the heat transfer plate to the exposed portion of the fuel pipe. Therefore, the liquid fuel is heated to a temperature at which the liquid fuel is vaporized completely, and liquid fuel is prevented from flowing into the mixer. Thereafter, the vaporized fuel is introduced to the mixer.

The fuel vaporizing apparatus of the second embodiment is simple in construction and can be relatively inexpensively made.

The fuel vaporizing apparatus of the second embodiment of the invention preferably also includes a plate shaped vaporizer in accordance with the first embodiment connected to the fuel pipe to which the heat transfer plate is fixed. Thus, the synergistic effect of the advantages of the first and second embodiments can be obtained, so that a further high vaporization efficiency of liquid fuel can be achieved.

According to a third embodiment of the present invention, a liquefied fuel vaporizing apparatus in accordance with the second embodiment further includes a baffle plate disposed between a cylinder cover of the engine and the vaporizer. The baffle is configured to deflect part of the high-temperature cooling air after the cooling of the cylinder body and guide the air toward the mixer so as to heat the mixer.

Preferably, part of the high-temperature air heated after the cooling of the cylinder body collides with the baffle plate so that the direction thereof is changed 90 degrees in the transverse direction so as to flow over the outlet and inlet pipe portions of the vaporizer. Thereafter, the high-temperature air flows into the mixer and heats it.

Therefore, the outlet and inlet pipe portions of the vaporizer, which tend to be easily cooled by the outside air, and the mixer, which tends to be cooled by the heat of vaporization, are heated by the high-temperature cooling air, so that the vaporization efficiency of liquid fuel is further improved.

BRIEF DESCRIPTION OF THE DRAWINGS

FIG. 3 is a front view showing the principal portion of an apparatus in accordance with the second embodiment of the present invention;

FIG. 4 is a perspective view of the vaporizer of the second embodiment;

DESCRIPTION OF THE PREFERRED EMBODIMENTS

Preferred embodiments of the present invention will now be described with reference to the accompanying drawings.

The scope of the present invention is not limited to the dimensions, material, shape, relative arrangement and the like of the elements described in the preferred embodiments.

Figure 1:
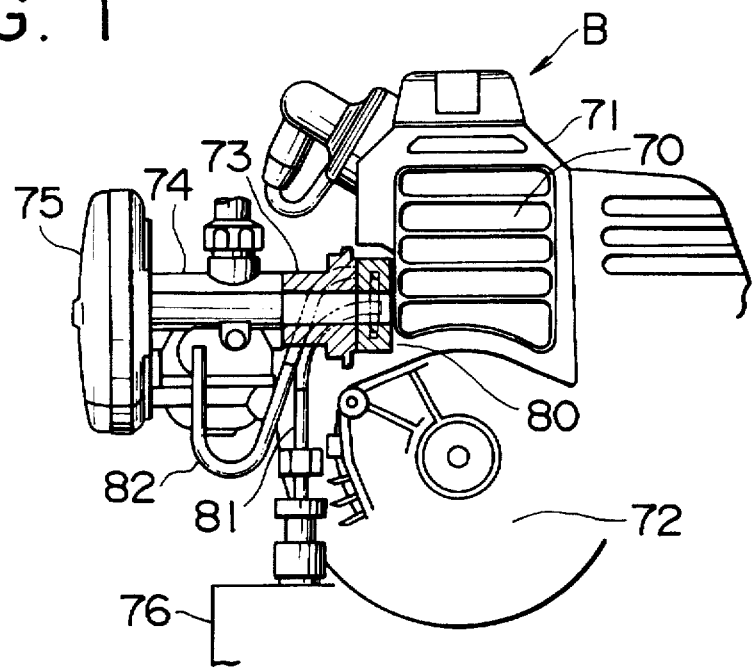
FIG. 1 is a front view showing the principal portion of a liquefied fuel vaporizing apparatus in accordance with the first embodiment of the present invention.
Figure 2:
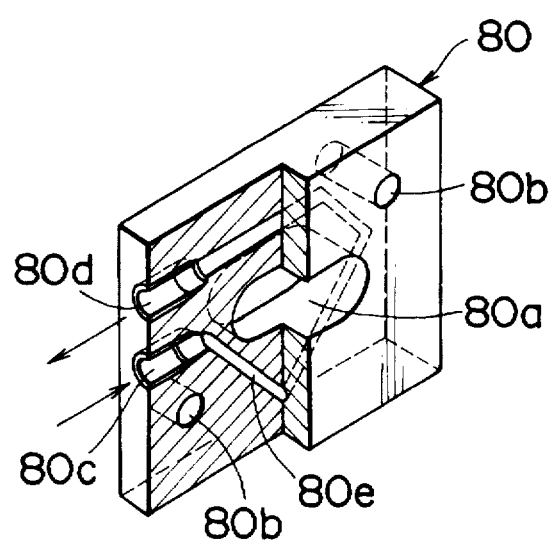
FIG. 2 is a perspective view of the vaporizer of the first embodiment.

FIG. 1 is a front view of a liquid fuel vaporizing apparatus in accordance with the first embodiment of the present invention, and FIG. 2 is a perspective view of a vaporizer.

With reference to FIG. 1, a 2-cycle engine B includes a cylinder body 70, a cylinder cover 71 integral with a fan case 22 (see FIG. 8), and a crankcase 72. An air cleaner 75 is connected to a mixer (pressure governor). An insulating tube 73 is interposed between the mixer 74 and a vaporizer 80 which will be described later.

Figure 8:
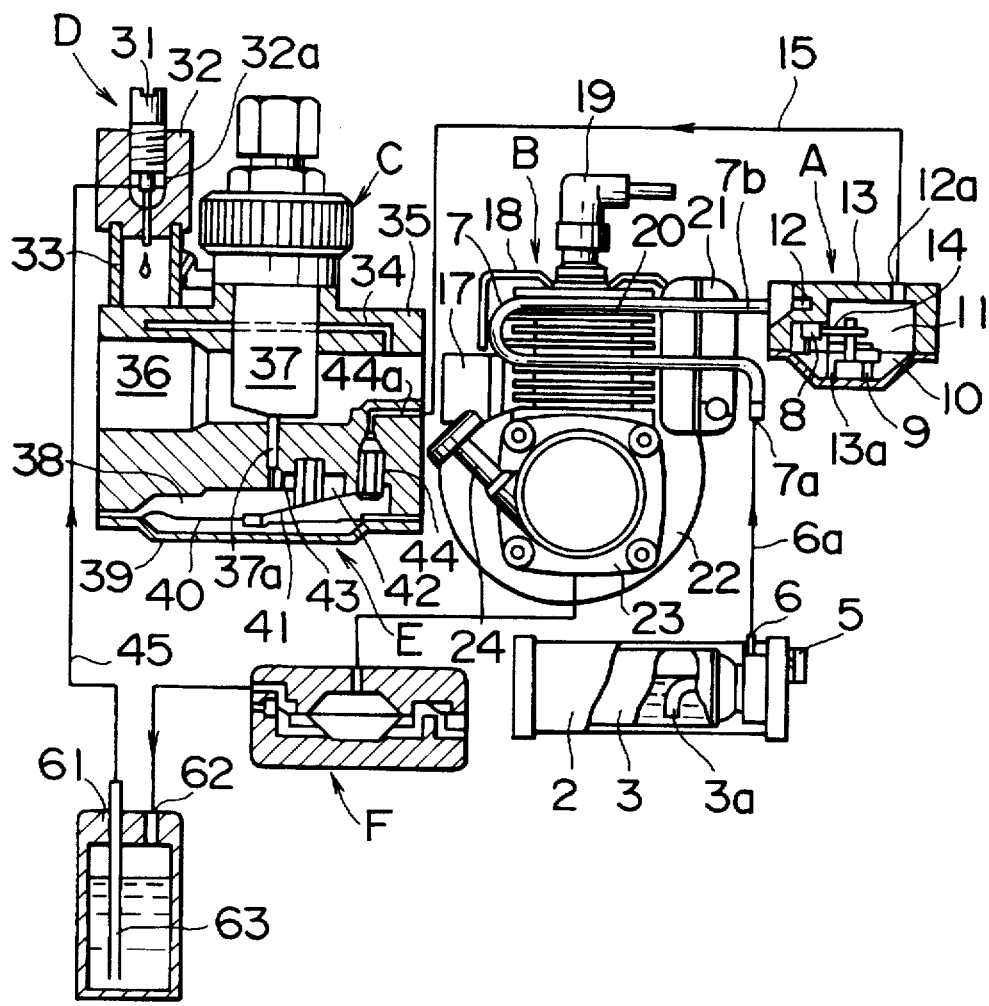
FIG. 8 is a front view of a conventional liquefied fuel supplying apparatus.

The vaporizing apparatus includes a liquefied gas vessel holder 76 for holding a liquified gas vessel 3 (see FIG. 8).

The vaporizer 80 is connected to the liquefied gas vessel holder 76 by a fuel pipe 81. A fuel pipe 82 connects the vaporizer 80 to the mixer 74.

With reference to FIG. 2, the vaporizer 80 comprises a thick plate shaped integral structure made of a metallic material with high thermal conductivity such as an aluminum alloy. A suction passage 80a for fuel gas is formed in the center in such a manner so as to pass through the vaporizer 80, and two attaching bolt holes 80b are formed at both sides. A fuel hole 80c is connected to the fuel pipe 81 from the gas vessel, and a fuel hole 80d is connected to the fuel pipe 82. The two fuel holes 80c and 80d are connected to each other by a fuel passage 80e disposed around the suction passage 80a in the vaporizer 80.

When the 2-cycle engine B is operating, liquid fuel from the liquefied gas vessel 3 (see FIG. 8) in the liquefied gas vessel holder 76 passes through the fuel pipe 81 and enters the vaporizer 80 through the fuel hole 80c. As the liquid fuel passes through the fuel passage 80e in the vaporizer 80, the liquid fuel is vaporized by heat which is conducted from the engine B through the wall surface of the vaporizer 80 and is thus converted to fuel gas. This fuel gas goes out of the fuel hole 80d and is supplied to the mixer 74 through the fuel pipe 82.

The vaporizer 80 can give sufficient heat necessary for vaporization to the fuel by thermal conduction from the cylinder body 70 of the engine B as described above. The insulating tube 73 isolates heat between the mixer 74 and vaporizer 80 and the cylinder body 20, like the conventional insulating tube, to prevent the mixer 74 from overheating.

FIGS. 3 and 4 show the second embodiment of the present invention. In this embodiment, the apparatus is constructed so that the liquid fuel is heated and vaporized by both cylinder heat and exhaust gas heat. In FIGS. 3 and 4, a vaporizer 83 has a bent pipe shaped heating portion 83a which runs around the cylinder body 70 from an inlet pipe portion 83e connected to the liquefied gas vessel 3 (see FIG. 8), thereby being heated by the cylinder body, and reaches an outlet pipe portion 83f connected to the mixer 74.

Also, the vaporizer 83 has a heat transfer plate 83b whose one end is fixed to the pipe shaped heating portion 83a and which is fixed to the flange of the exhaust passage of an exhaust muffler 176 with bolts. Reference numeral 83c denotes an exhaust hole, and 83d denotes a bolt hole for fastening the heat transfer plate 83b to the exhaust muffler 176.

Reference numeral 77 denotes a muffler cover, and other elements are the same as those shown in FIGS. 1 and 2.

When the 2-cycle engine in accordance with the second embodiment is operating, liquid fuel from the liquefied gas vessel 3 (see FIG. 8) enters the vaporizer 83 through the inlet pipe portion 83e. As the liquid fuel passes through the pipe shaped heating portion 83a running around the cylinder body 70, in the L portion shown in FIG. 4, the liquid fuel is heated by high-temperature air heated by the cooling of the cylinder body as well as by the conduction heat from the exhaust port via the heat transfer plate 83b. Thereupon, the liquid fuel is vaporized and sent to the mixer 74 through the outlet pipe portion 83f.

The vaporizer 80 of the first embodiment can be incorporated in the pipe shaped heating portion 83a of the second embodiment shown in FIGS. 3 and 4.

Figure 5:
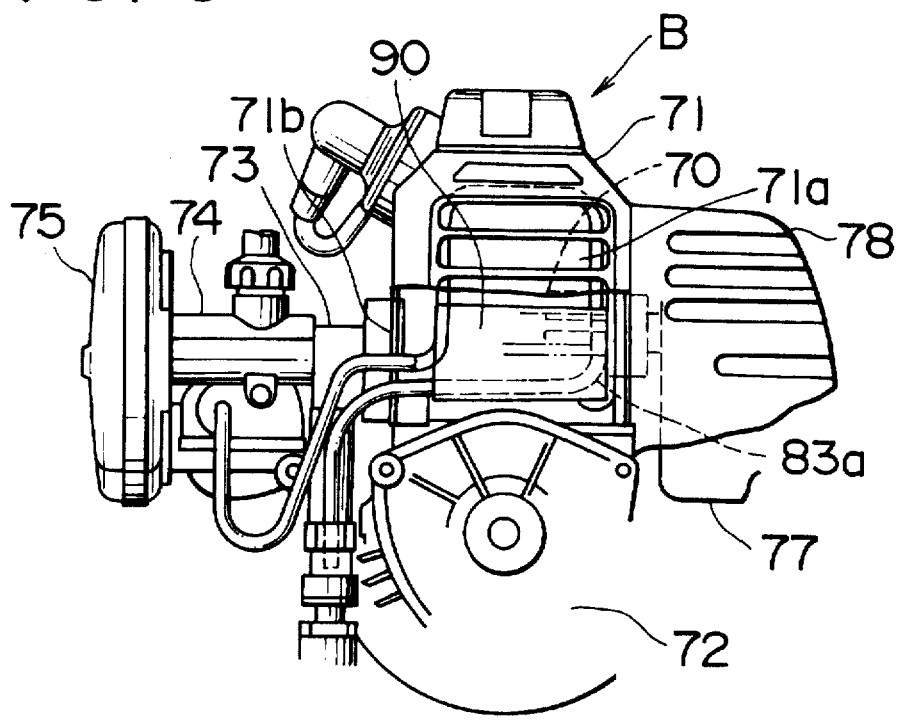
FIG. 5 is a front view showing the principal portion of an apparatus in accordance with the third embodiment of the present invention.
Figure 6:
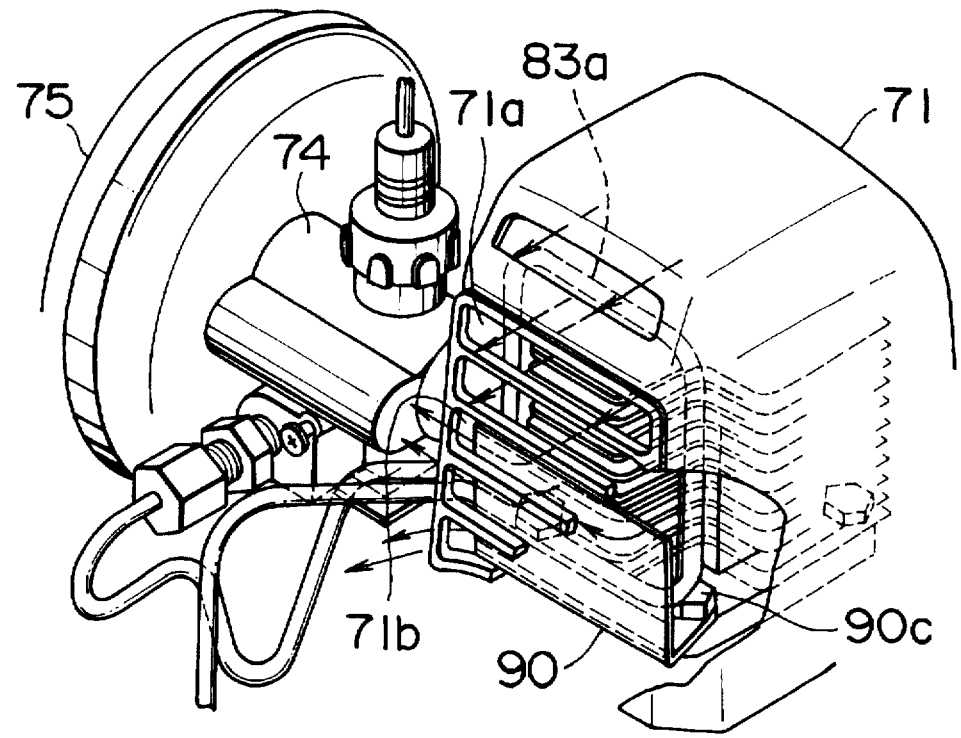
FIG. 6 is a perspective view of the apparatus of FIG. 5.
Figure 7:
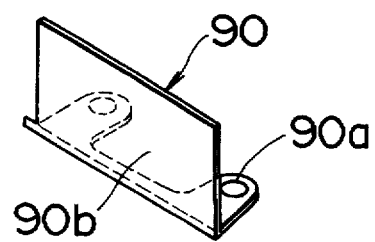
FIG. 7 is a perspective view of a baffle plate of the third embodiment.

FIGS. 5 to 7 show the third embodiment of the present invention. In this embodiment, a baffle plate 90 is additionally fitted to the vaporizer 83 of the second embodiment. In FIGS. 5 to 7, the baffle plate 90 is disposed vertically near the cylinder cover 71 between the pipe shaped heating portion 83a of the vaporizer 83 and the front of the cylinder cover 71.

The baffle plate 90 is formed of a substantially L-shaped sheet as shown in FIG. 7, and the main face portion 90b thereof is positioned in front of the pipe shaped heating portion 83a. As shown in FIG. 6, the baffle plate 90 is fixed to the cylinder body 70 by bolts 90c inserted into bolt holes 90a at the lower part (the bolts for fastening the cylinder body 70 to the crankcase may also be used for this purpose). Also, a notch hole 71b for inserting the vaporizer 83 is formed at the lower side of the cylinder cover 71.

In this third embodiment, the main face portion 90b of the baffle plate 90 is positioned near the cylinder cover 71 between the pipe shaped heating portion 83a of the vaporizer 83 and the cylinder cover 71, so that the baffle plate 90 blocks the lower part of a cooling air discharge port 71a (two of five holes shown in FIG. 6) in front of the cylinder cover 71. During the operation of the engine B, the cooling air goes from the rear to the front of the cylinder body 70 and receives heat from the cylinder body 70, thus becoming high-temperature air. The upper part of the high-temperature air goes forward without being blocked and is discharged to the outside through the discharge port 71a of the cylinder cover 71.

On the other hand, the lower part of the high-temperature air collides with the baffle plate 90 so that the advance direction thereof is changed 90 degrees in the transverse direction, and is discharged through the notch hole 71b on the side wall of the cylinder cover 71. After being bent to the transverse direction, this hot air heats the outlet pipe portion 83f and inlet pipe portion 83e of the vaporizer 83, and also reaches the mixer 74 to heat the mixer 74. That is to say, the high-temperature air guided by the baffle plate 90 heats the outlet and inlet pipe portions 83f and 83e of the vaporizer 83 which tend to be cooled by the outside air, and also heats the mixer 74 which tends to be cooled by the heat of vaporization.

As described above, according the present invention, since the vaporizer heats liquid fuel by the heat of direct heat conduction from the engine, a sufficient quantity of heat for vaporizing liquid fuel can be obtained without being affected by the outside air temperature. Therefore, unlike the conventional apparatus, unvaporized liquid fuel is not sent to the mixer, so that malfunctions of the mixer can be prevented.

Also, by the very simple and low-cost vaporizer consisting of the thick plate shaped body having the fuel passage therein or the heat transfer plate held in the exhaust passage, liquid fuel can be vaporized completely as described above.

Further, by installing the baffle plate, the vaporizer portion which tends to be cooled by the outside air and the mixer can be heated by the high-temperature air after the cooling of the cylinder.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 8-297227 filed on Oct. 18, 1996 including specification, claims, drawings and summary are incorporated herein by reference in its entirety.

What is claimed is:

1. A vaporizing apparatus for a gas engine equipped with a liquefied gas vessel and in which liquid fuel from the gas vessel is vaporized in the vaporizing apparatus and introduced into a mixer, the apparatus comprising:

a plate-shaped vaporizer constructed of a material having high thermal conductivity and formed with a fuel passage therein, the vaporizer being adapted to be affixed to a cylinder body of the engine in heat-exchange relationship therewith, an inlet of the fuel passage adapted to be connected to the liquefied gas vessel and an outlet of the fuel passage being adapted to be connected to the mixer, whereby liquid fuel received within the fuel passage is heated and vaporized by thermal conduction from the cylinder body to the vaporizer.

2. A vaporizing apparatus for a gas engine equipped with a liquefied gas vessel and in which liquid fuel from the gas vessel is vaporized in the vaporizing apparatus and introduced into a mixer, the engine including a blower for passing a stream of cooling air over the cylinder body from a first location at which the cooling air is at a relatively low temperature to a second location at which the cooling air is at a relatively high temperature, the apparatus comprising:

a fuel pipe adapted to connect the liquefied gas vessel to the mixer, at least a portion of the length of the fuel pipe being adapted to be exposed in heat-exchange relationship with the stream of cooling air at the second location; and a heat transfer plate constructed of a material having high thermal conductivity and including a first end connected in conductive heat-exchange relationship with said exposed portion of the fuel pipe, and a second end adapted to be connected in conductive heat-exchange relationship with a high-temperature exhaust member of the engine, whereby liquid fuel received within said exposed portion is heated and vaporized by heat transfer from both the cooling air and the exhaust member.

3. The vaporizing apparatus of claim 2 wherein the second end of the heat transfer plate is adapted to be connected to a flange face of an exhaust pipe of the engine such that heat is conducted from the flange face through the heat transfer plate to said exposed portion of the fuel pipe.

4. The apparatus of claim 2, further comprising:

a baffle adapted to be secured to the engine adjacent said exposed portion of the fuel pipe with said exposed portion disposed between the baffle and the cylinder body, the baffle adapted to deflect at least part of the stream of cooling air which passes over said exposed portion to the mixer so as to cause heating of the mixer.

5. The apparatus of claim 4, wherein the fuel pipe includes an inlet pipe portion adapted to be connected to the gas vessel and an outlet pipe portion adapted to be connected to the mixer, said exposed portion being between the inlet and outlet pipe portions, and wherein the baffle is adapted to deflect said part of the cooling air over at least portions of the inlet and outlet pipe portions so as to cause heating thereof.

6. A gas engine having improved vaporization of liquefied fuel at low ambient temperatures, comprising:

a gas engine including a cylinder body, a vessel for containing liquefied fuel, and a mixer which mixes vaporized fuel with air for ingestion by the engine; and a vaporizing apparatus for receiving liquid fuel from the gas vessel, vaporizing the liquid fuel, and introducing the vaporized fuel into the mixer, the vaporizing apparatus comprising:

a plate-shaped vaporizer constructed of a material having high thermal conductivity and formed with a fuel passage therein, the vaporizer being affixed to the cylinder body in heat-exchange relationship therewith, an inlet of the fuel passage connected to the liquefied gas vessel and an outlet of the fuel passage connected to the mixer, whereby liquid fuel received within the fuel passage is heated and vaporized by thermal conduction from the cylinder body to the vaporizer.

7. A gas engine having improved vaporization of liquefied fuel at low ambient temperatures, comprising:

a gas engine including a cylinder body, a vessel for containing liquefied fuel, a mixer which mixes vaporized fuel with air for ingestion by the engine, and a blower for passing a stream of cooling air over the cylinder body from a first location at which the cooling air is at a relatively low temperature to a second location at which the cooling air is at a relatively high temperature, the engine further including a vaporizing apparatus comprising:

a fuel pipe connected between the liquefied fuel vessel and the mixer, at least a portion of the length of the fuel pipe being exposed in heat-exchange relationship with the stream of cooling air at the second location; and a heat transfer plate constructed of a material having high thermal conductivity and including a first end connected in conductive heat-exchange relationship with said exposed portion of the fuel pipe, and a second end connected in conductive heat-exchange relationship with a high-temperature exhaust member of the engine, whereby liquid fuel received within said exposed portion is heated and vaporized by heat transfer from both the cooling air and the exhaust member.

8. The vaporizing apparatus of claim 7 wherein the second end of the heat transfer plate is connected to a flange face of an exhaust pipe of the engine such that heat is conducted from the flange face through the heat transfer plate to said exposed portion of the fuel pipe.

9. The apparatus of claim 7, further comprising:

a baffle secured to the engine adjacent said exposed portion of the fuel pipe with said exposed portion disposed between the baffle and the cylinder body, the baffle adapted to deflect at least part of the stream of cooling air which passes over said exposed portion to the mixer so as to cause heating of the mixer.

10. The apparatus of claim 9, wherein the fuel pipe includes an inlet pipe portion connected to the fuel vessel and an outlet pipe portion connected to the mixer, said exposed portion being between the inlet and outlet pipe portions, and wherein the baffle is adapted to deflect said part of the cooling air over at least portions of the inlet and outlet pipe portions so as to cause heating thereof.

* * * * *